United States Patent [19]

Amemiya

[11] Patent Number: 5,178,969
[45] Date of Patent: Jan. 12, 1993

[54] FUEL CELL POWERPLANT SYSTEM
[75] Inventor: Takashi Amemiya, Kawasaki, Japan
[73] Assignee: Kabushiki Kaisha Toshiba, Kawasaki, Japan
[21] Appl. No.: 718,427
[22] Filed: Jun. 20, 1991

[30] Foreign Application Priority Data

Jul. 6, 1990 [JP] Japan ................ 2-177244
Jul. 6, 1990 [JP] Japan ................ 2-177245

[51] Int. Cl.⁵ .............................. H01M 8/04
[52] U.S. Cl. ............................ 429/26; 429/34
[58] Field of Search ............... 429/17, 26, 34

[56] References Cited

U.S. PATENT DOCUMENTS

| | | | |
|---|---|---|---|
| 3,973,993 | 8/1976 | Bloomfield et al. | 429/17 |
| 4,678,723 | 7/1987 | Wertheun | 429/17 |
| 4,738,903 | 4/1988 | Garow et al. | 429/17 |
| 4,743,517 | 5/1988 | Cohen et al. | 429/17 |
| 5,045,414 | 9/1991 | Bushnell et al. | 429/17 |

FOREIGN PATENT DOCUMENTS

| | | |
|---|---|---|
| 62-190661 | 8/1987 | Japan . |
| 1-176667 | 7/1989 | Japan . |
| 2-226664 | 9/1990 | Japan . |

Primary Examiner—Stephen Kalafut
Attorney, Agent, or Firm—Foley & Lardner

[57] ABSTRACT

A fuel cell powerplant system comprises a fuel cell that houses in an airtight containment vessel a cell stack formed from many layers of individual fuel cells, a cooling water loop that cools the fuel cell, and a steam separator that is disposed on the side of an outlet of a fuel cell of the cooling loop and that discharges steam, and wherein one portion of the steam discharged from the steam separator is introduced via a purge steam line to the containment vessel or the cathode of the fuel cell for the purpose of purging containment vessel.

7 Claims, 4 Drawing Sheets

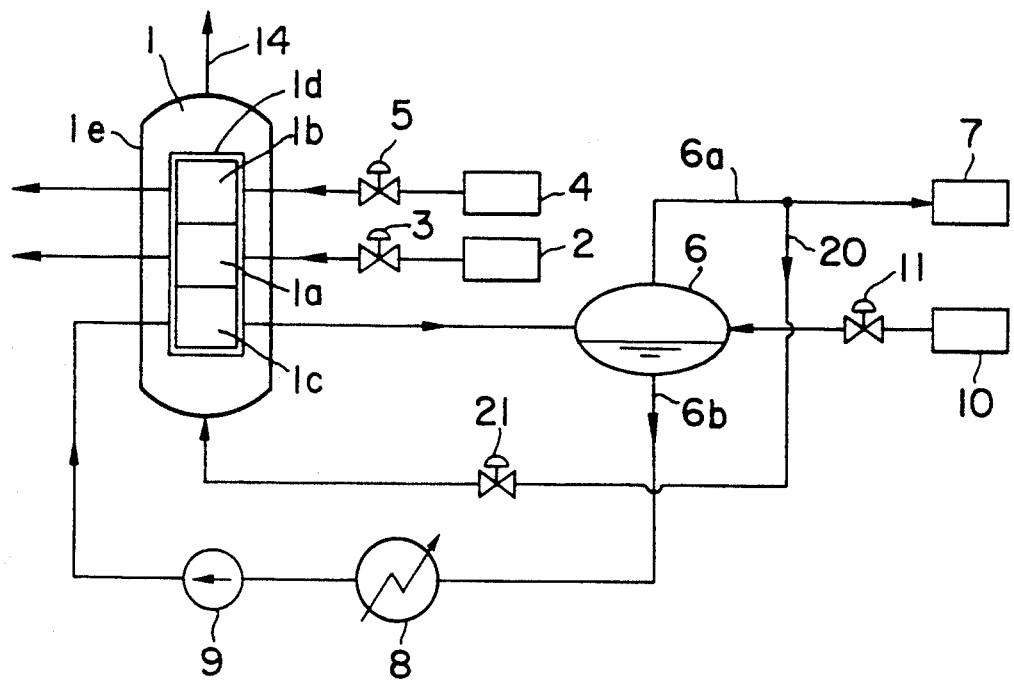
F I G. 1
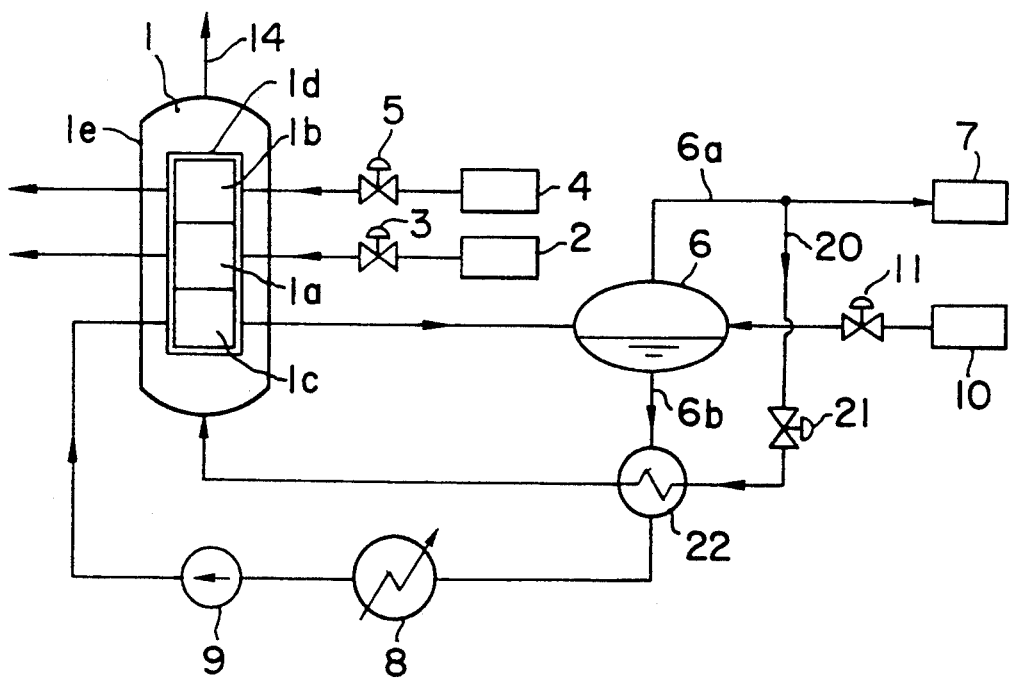
F I G. 2

FUEL CELL POWERPLANT SYSTEM

BACKGROUND OF THE INVENTION

The present invention relates to fuel cells, and more particularly, to a fuel cell system that has an improved purge means for the containment vessel and for the cathode oxidants.

In recent years, fuel cell power plant systems are known as a method for the direction conversion of the energy, that fuel has, into electrical energy. Such fuel cell powerplant systems normally have fuel cell unit cells configured by an electrolytic material being sandwiched between a pair of porous electrodes. Fuel such as hydrogen or the like is brought into contact with the rear of the anode which is one of the electrodes, while an oxidizing agent such as air or the like is brought into contact with the rear of the cathode which is the other electrode and the electro-chemical reaction that occurs when this is done is utilized to take electrical energy from between the two electrodes. Such a unit fuel cell is configured from a fuel cell stack that consists of many laminated layers, and it is possible to take electrical energy at high efficiency for as long as the fuel and the oxidizing agent are supplied to the stack.

In addition, in order for this electro-chemical reaction to have a favorable efficiency under conditions of high temperature and high pressure, the general practise is to house the fuel cell stack inside a sealed containment vessel, to perform operation under high pressure while cooling water is introduced to a cooler that is provided inside the fuel cell stack, and for a certain set of high temperature operating conditions to be maintained.

FIG. 6 is a view of such a conventional type of fuel cell system. More specifically, a fuel cell stack 1d comprising an anode 1a, a cathode 1b and cooling apparatus 1c is housed inside a containment vessel 1e to configure the fuel cell main unit 1. The structure of the fuel cell stack 1d is a laminate of many plates of unit cells such as has been described above but it shown as only a single element in the figure, for the sake of simplification.

When such a fuel cell is generating power, fuel such as highly concentrated hydrogen gas or the like is supplied from the fuel supply apparatus 2 to the anode 1a via a fuel valve 3. In addition to this, an oxidizing gas such as air or the like (air in the case of the following example) is supplied from an air supply apparatus 4 to the cathode 1b via an air valve 5. Furthermore, cooling water is supplied via a cooling water loop to the cooling apparatus 1c of the fuel cell stack 1d and is discharged from the cooling apparatus 1c when it has absorbed the heat that is generated by the fuel cell. The high-temperature water or the high-temperature two-phase flow that is discharged is led to a steam separator 6 and is separated into a steam 6a and water 6b. Also, in the case when there is high-temperature water at the outlet of the cooling apparatus 1c of the fuel cell stack 1d, there is a suitable pressure reduction means provided between the cooling apparatus 1c and the steam separator 6 so that it is possible to separate the steam 6a inside the steam separator 6. The steam 6a is sent to a heat recovery system 7 where the heat is used for various purposes. On the other hand, the water 6b, that has been separated from the steam again enters the cooling water loop, has its temperature adjusted at the heat exchanger 8 and is led to the cooling apparatus 1c of the fuel cell stack 1d by the cooling water pump 9. Also, insufficiency of the cooling water that is discharged as steam are replenished with water supplied from outside from a feed water system 10 via a feed water valve 11. Furthermore, an inert gas such as nitrogen or the like is supplied from an inert gas supply apparatus 12 and via an inert gas supply valve 13 to inside the containment vessel 1e so as to purge inside the containment vessel. After this, the inert gas such as nitrogen or the like is released to the outside from a purge discharge line 14.

The following is a description of the purposes of purging inside the containment vessel. More specifically, when the fuel cell stack is manufactured, the anodes and the cathodes of each of the laminated fuel cell units 1 are made to have sufficient gas sealing but deterioration with time accompanying extended periods of use or some other cause of sharp changes in the operating pressure or the like may cause some amount of gas leakage to occur while the cell 1 is in operation. In cases such as this, the fuel gas and air becomes mixed and are retained inside the containment vessel 1e, and there is a danger that there may be an explosion if there are the conditions for detonating gas. In order to remove this danger, inert gas is used to continuously or periodically purge the containment vessel 1e.

However, in such a conventional fuel cell powerplant system having the configuration described above, there are the following problems that should be solved, More specifically, in a large-scale powerplant system that has a stack having many fuel cells, when purging of the containment vessel of each stack is continuously or periodically performed, the amount of nitrogen gas or the inert gas consumed becomes considerably large when long-term operation is considered, and the running cost of the powerplant system overall is made large. In addition, it is necessary to have an initial investment for the apparatus (such as evaporators for the liquid nitrogen, and the like, for example) for the supply and storage of the inert gas and so this is disadvantageous for both the facility cost and the facility space, and it is required that there be the development of a means for purging the containment vessel and which does not use an inert gas such as nitrogen or the like.

The present invention is proposed in order to eliminate these problems and an object of the present invention is to enable the purging of the containment vessel of a fuel cell by a less expensive means, and to provide a fuel cell powerplant system that requires a smaller installation space.

Furthermore, as shown in FIG. 7, in a conventional fuel cell powerplant system, the configuration is such that an inert gas such as nitrogen or the like is introduced from the inert gas supply apparatus 12, to the inlet side of the cathode 1b and via an inert gas supply valve 13. This is so that the inert gas can be inserted into the cathode during a low load operation of the powerplant, or immediately after the shut down of powerplant operation and so that the concentration of the oxygen in the cathode can be reduced when there is an excessive voltage generated by the fuel cell.

The purpose of reducing the oxygen concentration inside the cathode as described above, is as follows. More specifically, when the fuel cell performs power generation operation at a low current density or when the powerplant stops its powergenerating operation, the cell voltage becomes higher than that to the rated powerplant operation generates when there is still sufficient air remaining inside the cathode. If this voltage exceeds a predetermined level and the status of excess voltage continues, then this is likely to facilitate a deterioration of the fuel cell performance. Therefore, in order to prevent such deterioration, the oxygen concentration inside the cathode is reduced in accordance with necessity so as to prevent the generation of an excessive cell voltage.

However, in a conventional fuel cell powerplant system having the configuration such as has been described above, there is the following problem that still has to be solved. More specifically, in a large-scale power plant system that has many fuel cell stacks, reducing the concentration of the oxygen inside the cathodes of each stack must be performed immediately after the shut down of powerplant operation or when there is low-load operation and so the amount of the nitrogen gas or inert gas used is considerable when there is operation for an extended period and when there is frequent start-up and shut-down, and the running cost of the powerplant system as an entirety becomes large. In addition, it is also necessary to have an initial investment for the apparatus (such as evaporators for the liquid nitrogen, and the like) for the storage and supply of the inert gas and so this is disadvantageous in terms of the facility cost and the installation space. It is therefore desirable that there be the development of a means for reducing the concentration of the oxygen at the fuel cell cathode and that does not use an inert gas such as nitrogen.

Furthermore, the present invention is proposed to eliminate these problems described above, and an object of it is to provide a fuel cell powerplant system that reduces the concentration of the oxygen at the fuel cell cathode by a less expensive means, and that enables the installation space for the fuel cell to be made smaller.

SUMMARY OF THE INVENTION

The present invention is a fuel cell powerplant system including a fuel cell that houses in an airtight containment vessel a cell stack formed from many layers of individual fuel cells, a cooling water loop that cools the fuel cell, and a steam separator that is disposed on the side of an outlet of a fuel cell of the cooling loop and that discharges steam, and is characterized in that one portion of the steam discharged from the steam separator is introduced to the containment vessel of the fuel cell to purge the containment vessel.

According to the fuel cell powerplant system of the present invention, it is possible to use one portion of the steam that is discharged from the steam separator as a purge gas instead of the conventional nitrogen or other inert gas and so it is not necessary to have the apparatus for the storage and supply of the nitrogen or the inert gas as is conventionally necessary.

In addition, the present invention is a fuel cell powerplant system including a fuel cell that has a cell stack formed from many layers of individual fuel cells, a cooling water loop that cools the fuel cell, and a steam separator that is disposed on the side of an outlet of a fuel cell of the cooling loop and that discharges steam, and is characterized in that one portion of the steam discharged from the steam separator is introduced to the cathode of the fuel cell so as to reduce the concentration of oxygen at the cathode.

According to the fuel cell powerplant system of the present invention, one portion of the steam discharged from the steam separator is introduced to the cathode of the fuel cell so as to reduce the concentration of oxygen at the cathode and uses as a purage gas so that the apparatus for the storage and supply of the nitrogen or the inert gas as is conventionally necessary can be either eliminated or reduced in scale.

BRIEF DESCRIPTION OF DRAWINGS

FIG. 1 is a view of a configuration of a first embodiment of the fuel cell powerplant system of the present invention;

FIG. 2 is a view of a configuration of a second embodiment of the fuel cell powerplant system of the present invention;

DETAILED DESCRIPTION OF THE PREFERRED EMBODIMENTS

Figure 6:
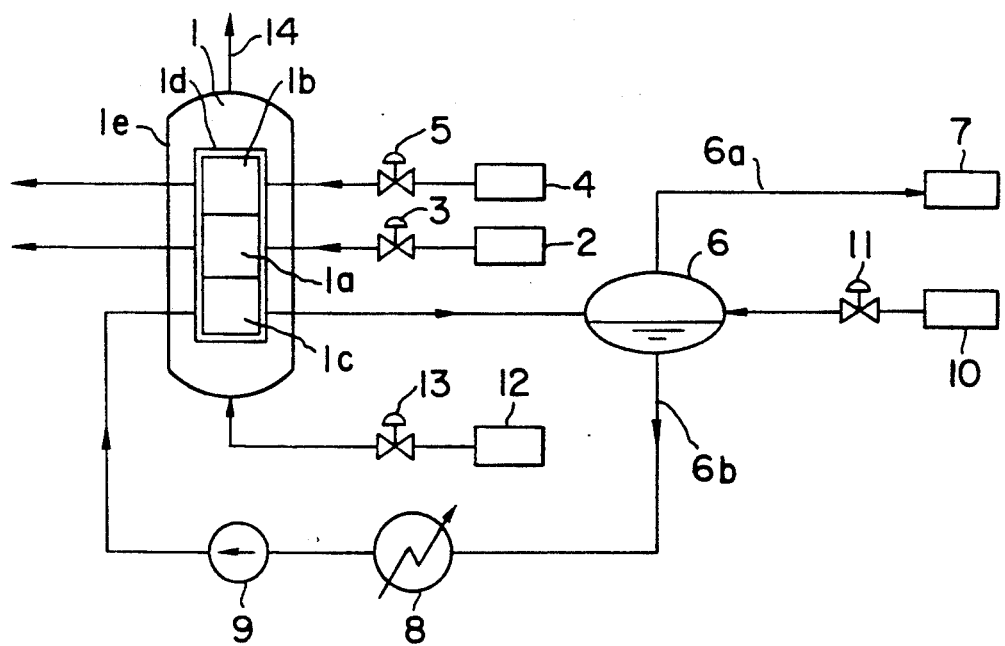
FIGS. 6 and 7 are views of the configuration of one example of a conventional fuel cell powerplant system.
Figure 7:
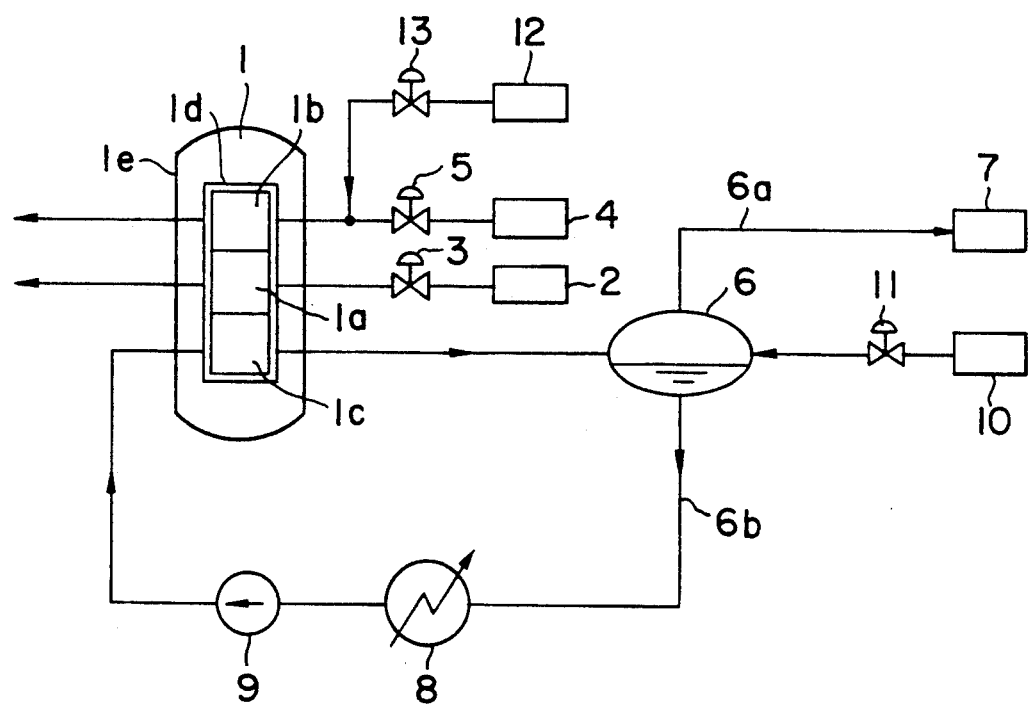

The following is a detailed description of preferred embodiments of the present invention, with reference to FIG. 1 through FIG. 5. Moreover, those portions of FIGS. 6,7 that are the identical or similar to corresponding portions of the conventional apparatus are indicated with corresponding numerals, and the corresponding descriptions of them are omitted.

First Embodiment

As shown in FIG. 1, in this embodiment, there is provided a purge steam line 20 that introduces one portion of the steam 6a separated by the steam separator 6 into the containment vessel 1e. This purge steam line 20 is provided so as to branch from the steam line connecting the steam separator 6 and the heat recovery system 7, and is connected to the cell containment vessel 1e via the purge steam supply valve 21. In addition, the purge steam supply valve 21 can have its degree of opening adjusted so that a constant amount of purge steam can be supplied to the containment vessel 1e.

Moreover, the purge can be performed by opening the purge steam supply valve 21 periodically. Alternatively, should there be a gas leak from the anode 1a inside the containment vessel 1e, that leak is detected by a gas sensor and that detection data is used as the basis for suitably opening the purge steam supply valve 21 and performing a steam purge. In addition, it is desirable that the size of the purge steam supply valve 21 be selected so that a suitable containment vessel pressure can be obtained so that the purge steam does not condense in the containment vessel. For example, when powerplant operation of the fuel cell 1 is performed under conditions of 200° C. and 5 ata., if there is operation when the pressure of the cooling water system loop is approximately 15.9 ata., then two phase flow cooling can be sufficiently performed inside the cell stacks 1d. Accordingly, the steam obtained from the steam separator 6 becomes saturated steam in the vicinity of this pressure. When one portion of this steam has its pressure reduced by the purge steam supply valve 21 to 5.5 ata. and is introduced .into the containment vessel 1e, there is a little enthalpy change of the steam and so the temperature of the purge steam drops to approximately 170° C. However, there is a surplus with respect to the 155° C. of the condensation temperature and so if the rise of the purge steam temperature close to an operating temperature of 200° C. in the containment vessel 1e is considered, then there will be no condensing of the steam in the containment vessel 1e.

The following is a description of a fuel cell powerplant system of the present embodiment and having the configuration described above. More specifically, when there is continuous or periodical purging operation, one portion of the steam 6a that is separated by the steam separator 6 can be introduced into the containment vessel 1e by the purge steam line 20 and so it is possible to purge the inside of the containment vessel 1e of the cell stack 1d by the steam 6a. As a result, the supply of inert gas such as nitrogen or the like and which was conventionally necessary for purging the containment vessel 1e is not necessary and thus it is also not necessary to store the inert gas in large quantities. Accordingly, it is possible to reduce the apparatus installation space and to also reduce the cost.

Second Embodiment

As shown in FIG. 2, this embodiment is also provided with a purge steam line 20 that introduces one portion of the steam 6a separated by the steam separator 6 into the containment vessel 1e. This purge steam line 20 is provided so as to branch from the steam line connecting the steam separator 6 and the heat recovery system 7, and is connected to the cell containment vessel 1e via the purge steam supply valve 21 and a heat exchanger 22 provided on the downstream side of the purge steam supply valve 21. In addition, the heat exchanger 22 is configured so that there is heat exchange between the high temperature cell cooling water that is separated by the steam separator 6. The other portions of the configuration are the same as those of the first embodiment.

The following is a description of the operation of a fuel cell powerplant system according to this embodiment and having a configuration such as that described above. More specifically, when there is continuous or periodical purging operation, the opening of the purge steam supply valve 21 causes one portion of the steam 6a that is separated by the steam separator 6 can be introduced into the containment vessel 1e by the purge steam line 20. When this is done, because of a little enthalpy change the steam temperature drops. However, in this embodiment, along the purge steam line 20 is provided a heat exchanger 22 that performs heat exchange between the high-temperature cell cooling water that is separated by the steam separator 6 and so the purge steam for which the temperature has dropped is heated by the high-temperature cooling water to again become high-temperature steam which is introduced into the containment vessel 1e. As a result, the temperature of the purge steam becomes sufficiently higher than the level of the condensation temperature, so that for example, at a temperature less than a fuel cell operating temperature of approximately 200° C., it is possible to not have the purge steam condense inside the containment vessel 1e even if the pressure inside the containment vessel 1e is close to 10 ata. Accordingly, even if the operating pressure conditions for the fuel cell 1 include a high pressure of 10 ata., it is possible for the steam to perform purging of the containment vessel 1e. In general, because a higher powerplant efficiency can be attained for the higher operating pressure of the fuel cell there is high pressure operation such as this, it is extremely favorable that the containment vessel 1e can be purged using steam.

In this manner, in this embodiment as well, it is possible to purge the inside of the containment vessel 1e of the cell stack 1d by the steam 6a. As a result, the supply of inert gas such as nitrogen or the like and which was conventionally necessary for purging the containment vessel 1e is not necessary and thus it is also not necessary to store the inert gas in large quantities. Accordingly, it is possible to reduce the installation space of the plant and to reduce the manufacturing cost.

Third Embodiment

Figure 3:
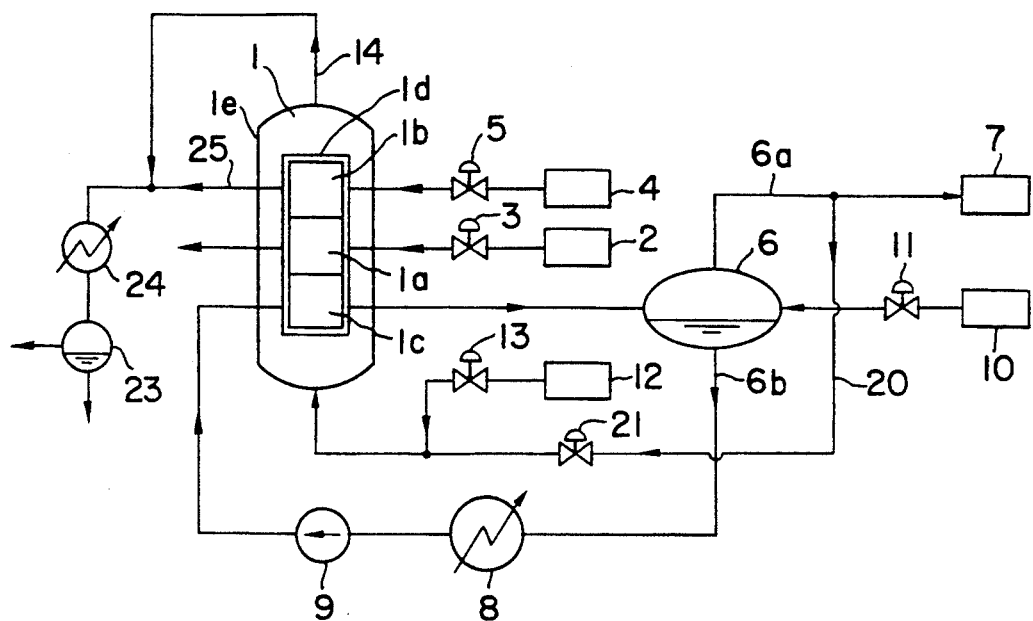
FIG. 3 is a view of a configuration of a third embodiment of the fuel cell powerplant system of the present invention.

As shown in FIG. 3, in the same manner as the first embodiment, this embodiment is provided with a purge steam line 20 that branches from the steam line that connects the steam separator 6 and the heat recovery system 7, and is connected to the containment vessel 1e via the purge steam supply valve 21. In addition, this configuration has the purge steam line 20 connected to the inert gas supply apparatus 12 via the inert gas supply valve 13, and the purging of the containment vessel 1e is performed by either steam or by an inert gas.

Furthermore, in this embodiment, a condenser 24 and a steam separator 23 are provided to the discharge line side of the cathode 1b of the fuel cell main unit 1. In addition, the purge discharge line 14 that is led from the containment vessel 1e meets the discharge line 25 of the cathode 1b. Moreover, in the condenser 24 and the steam separator 23, the steam that is generated and discharged in the cathode 1b accompanying powerplant operation of the fuel cell 1 is condensed and recovered as water but in this configuration, there is also the condensing and recovery of the purge steam that is discharged from the fuel cell containment vessel 1e.

The following is a description of the operation of a fuel cell powerplant system of this embodiment and having a configuration such as this. More specifically, when there is normal fuel cell powerplant operation, the containment vessel purge is performed by opening the purge steam supply valve 21 and by leading steam into the containment vessel 1e. On the other hand, prior to the start of power generation or after the stop of power generation, when there is not the generation of steam by the heat of the fuel cell, the inert gas supply valve 13 is opened and nitrogen or some other inert gas is led into the containment vessel 1e to purge the containment vessel 1e. However, the storage amount and the supply amount of nitrogen or some other inert gas is relatively small when compared to that conventionally required. Furthermore, the purge steam that is discharged from the purge discharge line 14 in this embodiment flows into the discharge line 25 and is condensed in the condenser 24 and the steam separator 25 and can be recovered as water, which can then be used as supply water for the fuel cell cooling water loop.

In this manner, with this embodiment, it is possible to use the purge steam to purge the containment vessel 1e while the fuel cell 1 is generating power. On the other hand, or there is not power generation operation for example, and there is not sufficient steam to perform purging, it is possible to use nitrogen or some other inert gas in the conventional manner to purge the containment vessel 1e and so it is possible to safely purge the containment vessel 1e under all operating conditions.

Moreover, in this embodiment, the condenser 24 and the steam separator 23 are provided to the outlet side of the fuel cell cathode 1b but the same effect can be obtained if these are provided on the outlet side of the anode 1a and the discharge line 14 for the containment vessel purge steam flows into the anode discharge line and the purge steam then condensed by the condenser 24 and recovered as water.

As has been described above, according to this embodiment, one portion of the steam discharged from the steam separator 6 is introduced to the containment vessel 1e of the fuel cell to purge the containment vessel 1e and so purging the containment vessel 1e can be performed by a less expensive means, and also provide a fuel cell powerplant system that requires a smaller installation space.

Fourth Embodiment

Figure 4:
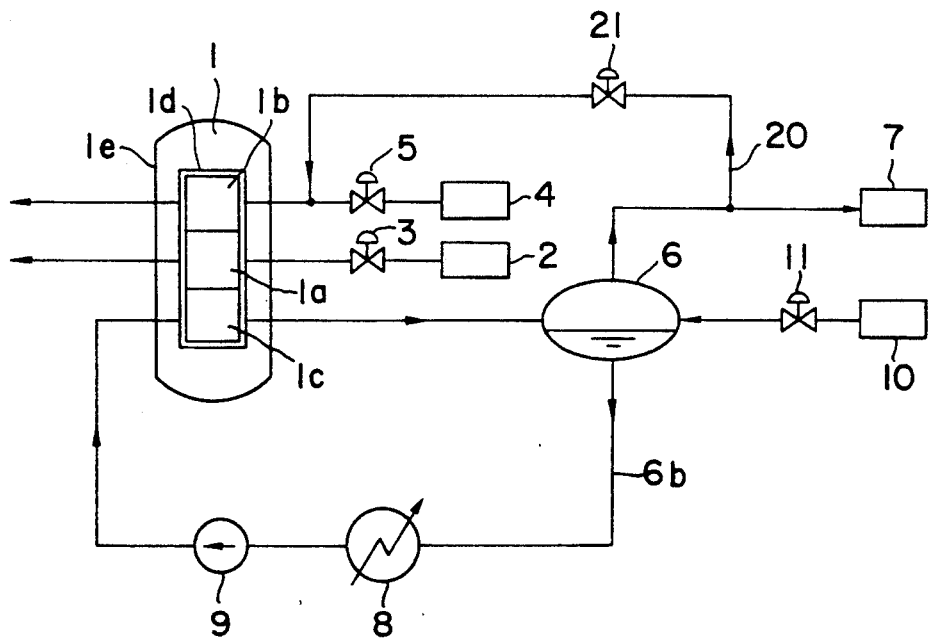
FIG. 4 is a view of a configuration of a fourth embodiment of the fuel cell powerplant system of the present invention.

As shown in FIG. 4, this embodiment is provided with a purge steam line 20 that leads one portion of the steam 6a separated by the steam separator 6 to the cathode 1b. This purge steam line 20 is provided so as to branch from the steam line that connects the steam separator 6 and the heat recovery system 7, and is connected to the containment vessel 1e via the purge steam supply valve 21. In addition, the cell voltage is monitored and the degree of opening of the steam supply valve 21 is adjusted in accordance with the level of the detected voltage so that the cell voltage does not become excessive.

Moreover, immediately after the stop of fuel cell powerplant operation, the degree of opening of the steam supply valve 21 can be adjusted in accordance with a time schedule determined beforehand. In addition, the size of the steam supply valve 21 can be selected so that the inserted steam does not condense inside the cathode 1b. For example, when powerplant operation of the fuel cell is performed under operating conditions of 200° C. and 5 ata., and the pressure of the cooling water loop system is approximately 15.9 ata., then two phase cooling is performed inside the cell stack. Accordingly, the steam obtained from the steam separator 6 becomes saturated steam at close to this pressure. If one portion of this steam is reduced to a pressure of 5.5 ata. by the steam supply valve 21 and is led to the cathode, then a little enthalpy change of the steam causes the temperature of the steam to drop to approximately 170° C. However, there is still a surplus with respect to the condensate temperature of 155° C. and so if the rise of the steam temperature to close to the operating temperature of 200° C. at the cathode 1b is considered, then there will be no condensation inside the cathode 1b.

The following is a description of the operation of a fuel cell powerplant system of this embodiment and having a configuration such as this. More specifically, when there is the generation of an excessive voltage during a low load power generation or immediately after the stop of powerplant operation, the opening of the steam supply valve causes one portion of the steam 6a separated by the steam separator 6 to be led inside the cathode 1b by the cathode steam line 20, and this steam 6a that is led in allows a reduction of the oxygen concentration inside the cathode 1b. As a result, the supply of nitrogen or the inert gas that is used in the conventional system to reduce the oxygen concentration inside the cathode 1b is not necessary, and therefore the storage of large quantities of the inert gas is also not necessary. Accordingly, it is possible to reduce the installation space required by the apparatus and to also reduce the manufacturing cost.

Fifth Embodiment

Figure 5:
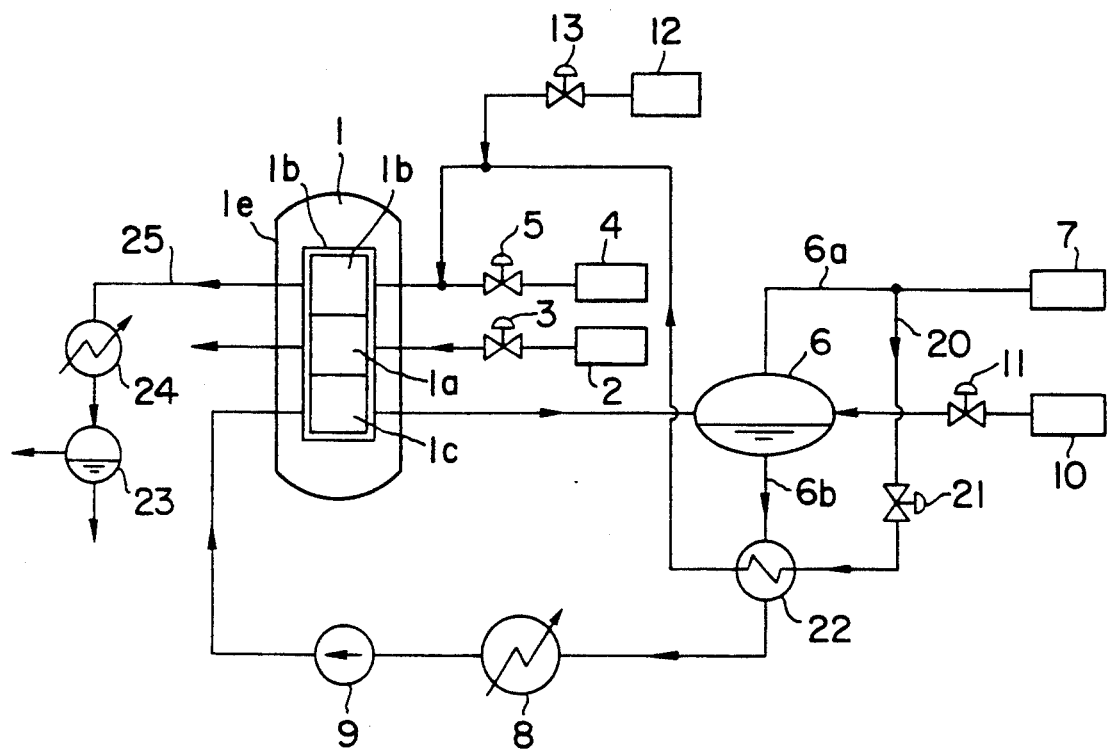
FIG. 5 is a view of a configuration of a fifth embodiment of the fuel cell powerplant system of the present invention.

As shown in FIG. 5, this embodiment is also provided with a purge steam line 20 that leads one portion of the steam 6a separated by the steam separator 6 to the cathode 1b. This purge steam line 20 is provided so as to branch from the steam line that connects the steam separator 6 and the heat recovery system 7, and is provided so as to branch from the steam line connecting the steam separator 6 and the heat recovery system 7, and connects the steam supply line to the cathode 1b via the heat exchanger 22 provided to the steam supply valve 21 and its downstream side. In addition, the heat exchanger 22 is configured so as to exchange heat with the high-temperature water 6b that is separated by the steam separator 6. In addition, the cathode steam line 20 is connected to a nitrogen or other inert gas supply apparatus 12 via the inert gas supply valve 13, and the lowering of the oxygen concentration of the cathode 1b is performed by either steam or by the inert gas. Furthermore, a condenser 23 and a steam separator 24 are provided to the side of the discharge lie 25 of the cathode 1b, and the steam that is generated and discharged in the cathode 1b accompanying powerplant operation of the fuel cell 1 is condensed and recovered as water. The other portions of this configuration are the same as for the fourth embodiment.

The following is a description of the operation of a fuel cell powerplant system of the present embodiment and having the configuration described above. More specifically, opening the steam supply valve 21 causes one portion of the steam 6a that is separated by the steam separator 6 to be led to the cathode by the cathode steam line 20, but when this is done, the cathode steam has its pressure reduced by the steam supply valve 21 and because of a little enthalpy change the steam temperature drops. However, in the present embodiment, the cathode steam line 20 is provided with a heat exchanger 22 that performs heat exchange with the high-temperature water 6b that is separated by the steam separator 6 and so the cathode steam for which the temperature has dropped is heated by the high temperature water 6b to again become high-temperature steam which is then led to the cathode 1b. As a result, the temperature of the water that is led to the cathode 1b becomes sufficiently higher than the temperature of the compensate for that for example, at a cell powerplant operation of less than approximately 200° C., the steam that is led to the cathode 1b does not condense even if the cell operating pressure is close to 10 ata. Accordingly, even if the operating pressure condition for the fuel cell 1 is a high pressure of about 10 ata., it is still possible to reduce the concentration of the oxygen inside the cathode 1b. In general, because a higher power generation efficiency can be attained for the higher operating pressure of the fuel cell and so even when there is, it is extremely desirable that steam can be used to reduce the oxygen concentration inside the cathode even when there is such high pressure operation.

On the other hand, prior to the start of power generation or after stop of power generation, when there is not the generation of steam by the heat of the fuel cell 1, the inert gas supply valve 13 is opened and nitrogen or some other inert gas is led into the cathode 1b so that the oxygen concentration inside the cathode 1b can be reduced. However, the storage amount and the supply amount of nitrogen or some other inert gas is relatively small when compared to that conventionally required. Furthermore, in the present embodiment, a condenser 23 and a steam separator 24 are provided to the side of the discharge line 25 of the cathode 1b and so it is possible for the steam that is discharged from the cathode 1b accompanying powerplant operation of the fuel cell 1 to be condensed and recovered as water which can then be led back to the fuel cell cooling water loop.

In this manner, in the present embodiment, the oxygen concentration inside the cathode 1b can be reduced by the cathode steam while there is powerplant operation of the fuel cell 1, and when the powerplant operation has stopped and sufficient steam can not be obtained, it is possible to use nitrogen or some other inert gas in the conventional manner so that the oxygen concentration in the cathode can be sufficiently reduced under any operating conditions.

As has been described above, the configuration of the present invention provides a fuel cell powerplant system in which one portion of the steam that is discharged from a steam separator 6 disposed in a cell cooling water loop is led to the cathode 1b of a fuel cell 1 so that it is possible to reduce the oxygen concentration of the fuel cell cathode 1b by a less expensive means, and for the installation space to be reduced in size.

What is claimed is:

1. In a fuel cell powerplant system comprising a fuel cell installed in an airtight containment vessel a cell stack formed from a plurality of layers of individual fuel cells, a cooling water loop for the fuel cell, and a steam separator disposed on the side of an outlet of a fuel cell of the cooling loop and discharging steam, the improvement comprising:

a purge steam line which introduces one portion of the steam discharged from the steam separator into the containment vessel of the fuel cell to purge the containment vessel.

2. The fuel cell powerplant system of claim 1, wherein a heat exchanger to exchange heat with the high-temperature cell cooling water separated by the steam separator is disposed in said purge steam line.

3. The fuel cell powerplant system of claim 1, wherein an inert gas supply apparatus is connected to said purge steam line via an inert gas supply valve enabling to purge the inside of the containment vessel by either steam or an inert gas.

4. The fuel cell powerplant system of claim 1 wherein a condenser and a steam separator are provided to the discharge line side of an cathode to perform condensation and water recovery of the purge steam that is discharged from the containment vessel.

5. The fuel cell powerplant system of claim 2, wherein an inert gas supply apparatus is connected to said purge steam line via an inert gas supply valve enabling to purge the inside of the containment vessel by either steam or an inert gas.

6. The fuel cell powerplant system of claim 2, wherein a condenser and a steam separator are provided to the discharge line side of an cathode to perform condensation and water recovery of the purge steam that is discharged from the containment vessel.

7. The fuel cell powerplant system of claim 3, wherein a condenser and a steam separator are provided to the discharge line side of an cathode to perform condensation and water recovery of the purge steam that is discharged from the containment vessel.

* * * * *